United States Patent Office 3,775,513
Patented Nov. 27, 1973

3,775,513
STABILIZED UNSATURATED POLYESTERS WITH 2,4-DINITROPHENOL AS STABILIZER
John G. Baker, Cheswick, and Oliver M. Yerty, Lower Burrell, Pa., assignors to PPG Industries, Inc., Pittsburgh, Pa.
No Drawing. Continuation-in-part of abandoned application Ser. No. 671,961, Oct. 2, 1967. This application Mar. 11, 1971, Ser. No. 123,463
Int. Cl. C08g 51/60
U.S. Cl. 260—864
14 Claims

ABSTRACT OF THE DISCLOSURE

This invention relates to polymerizable compositions comprising a polyester of a polyhydric alcohol and an ethylenically unsaturated carboxylic acid in combination with a copolymerizable monomer, and especially alpha-methyl styrene, which are stabilized with 2,4-dinitrophenol, alone, or in combination with quinones or hydroquinones. These stabilized compositions display improved uncatalyzed storage stability, as well as improved catalyzed tank life stability, yet cure at conventional temperatures with little effect on the curing rate due to the presence of the stabilizer.

CROSS REFERENCE TO RELATED APPLICATION

This application is a continuation-in-part of U.S. application Ser. No. 671,961, filed Oct. 2, 1967, for Stabilized Unsaturated Polyesters, which application is now abandoned.

Unsaturated polyesters are well-known items of commerce and find great utility in such areas as fiber glass reinforced molding, as well as filled polyester molding. Polyester resins, their composition and application have been discussed in such publications as Polyesters and Their Applications by Bjorksten, Reinhold Publishing Corporation (1956).

Conventionally, liquid or fusible linear polyesters with polymerizable, ethylenically unsaturated sites are admixed with ethylenically unsaturated compounds, often referred to as "monomers" and the mixture copolymerized in the presence of a free-radical initiating catalyst.

These polymerizable mixtures undergo an additional reaction through the points of carbon unsaturation, even at room temperature in some cases. This strong tendency to copolymerize was recognized early in the art and conventionally inhibitors have been employed to prevent the premature gelation during storage.

The use of alpha-methyl styrene as a monomer with polyester resins, replacing all, or most usually, a part of the more conventional styrene monomer has many distinct advantages, including lower peak exotherm, a slower cure and a resistance to cracking in large sections; however, unsaturated polyester resin compositions containing as little as 1 percent alpha-methyl styrene display increased storage instability and decreased tank life as opposed to those compositions having the more conventional styrene monomer. Likewise, it has also been found that many of those materials which are conventionally employed as stabilizers for styrene-containing unsaturated polyester resins are ineffective in the presence of alpha-methyl styrene. Of a number of compounds tested only one proved to effectively stabilize alpha-methyl styrene-containing polyesters.

It has now been found that 2,4-dinitrophenol, alone or in combination with hydroquinone or quinone, gives acceptable storage and catalyzed tank life stability to the polyester-monomer mixture without adversely affecting the cure rate.

The unsaturated polyester resins utilized in the compositions of this invention include unsaturated polyester resins which are mixtures comprising (A) a polyester of an alpha,beta-ethylenically unsaturated dicarboxylic acid and a polyhydric alcohol and (B) a monomer containing a vinyl group and especially styrene and/or alpha-methyl styrene.

The ethylenically unsaturated discarboxylic acids include such acids as:

| maleic acid | mesaconic acid |
| fumaric acid | citraconic acid |
| aconitric acid | itaconic acid | and the halo- and alkyl-derivatives of such acids, and the like, the preferred acid being maleic acid. The anhydrides of these acids, where the anhydrides exist, are, of course, embraced under the term "acid," since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyester resins include:

| ethylene glycol | glycerol |
| diethylene glycol | neopentyl glycol |
| polyethylene glycol | pentaerythritol |
| propylene glycol | trimethylol propane |
| dipropylene glycol | trimethylol ethane |
| polypropylene glycol | | and the like. The preferred polyols for the purposes of this invention have a molecular weight of less than about 2000 and consist essentially of carbon, hydrogen and oxygen. The polyhydric alcohols are generally employed in equal molar ratio to the total acid components, or in a slight excess, as, for example about 5 mol percent excess.

Saturated dicarboxylic acids may be utilized in combination with the unsaturated acid or anhydride in the preparation of unsaturated polyester resins. Such acids increase the length of the polyester without adding additional crosslinking sites, which is a desirable feature in some polyesters. Examples of useful dicarboxylic acids which are either saturated or only aromatically unsaturated include:

succinic acid
adipic acid
suberic acid
azelaic acid
sebacic acid
phthalic acid
isophthalic acid
terephthalic acid
tetrachlorophthalic acid
hexachloroendomethylenetetrahydrophthalic acid and the like. As in the case of the ethylenically unsaturated acids, the anhydrides of these acids, where the anhydrides exist, are, of course, embraced in the term "acid," since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated polycarboxylic acids" may also be referred to as "non-olefinically unsaturated" polycarboxylic acids.

Vinyl monomers which crosslink with unsaturated polyesters to form thermosetting materials, and which may be incorporated in the instant resinous compositions in addition to alpha-methyl styrene or styrene include:

| | |
|---|---|
| chlorostyrene | methyl acrylate |
| vinyl toluene | methyl methacrylate |
| divinyl benzene | hexyl acrylate |
| vinyl acetate | octyl acrylate |
| allyl acetate | octyl methacrylate |
| diallyl phthalate | diallyl itaconate |
| diallyl succinate | diallyl maleate |
| diallyl adipate | diallyl fumarate |
| diallyl sebacate | triallyl cyanurate | and the like. The preferred monomers are liquid compounds which dissolve the polyester component. Such monomers should preferably be free of non-aromatic carbon-carbon conjugated double bonds.

The monomer component or components may be employed over a broad range, but usually the proportion thereof, upon a weight basis, will be less than the polyester component. The amount of monomer should be sufficient to provide a liquid, flowable, interpolymerizable mixture—ordinarily, about 10 percent to about 60 percent by weight of the total mixture of polyester and monomer. At the preferred range, the monomer is present in an amount of about 20 percent to about 50 percent. In the preferred compositions of the instant invention, the monomer may be wholly alpha-methyl styrene; however more conventionally, from about 3 to about 50 percent of the monomer comprises alpha-methyl styrene, and more preferably, from about 10 to about 30 percent of the monomer component comprises alpha-methyl styrene. However, as has been previously stated, amounts of alpha-methyl styrene as low as 1 percent of the monomer component create stability problems and may be stabilized by the inhibitors of the invention. The stabilizers disclosed herein are operable on all the conventional cross-linking monomer systems and especially where the monomer is styrene.

Since the polyester component of the interpolymerizable mixture is often highly viscous or even solid at ambient temperatures, it is preferable to add the monomer thereto at a temperature sufficient to render the polyester satisfactorily fluid for incorporation of the monomer. This temperature is usually in the range of about 100° C. to about 120° C. which is sufficient high, in the absence of gelation inhibitors, to induce premature gelation upon introduction of the monomer into the system. This is true even in the absence of a free-radical catalyst. The stabilizers of the instant invention are, therefore, preferably added immediately after the polyester has been cooked, or added with the crosslinking monomer. Obviously, however, the effect of extending the tank life of the catalyzed resin may be achieved by incorporation of the stabilizers immediately before the addition of catalyst.

The stabilizer of this invention comprises 2,4-dinitrophenol, alone or in combination with a quinone or hydroquinone.

The hydroquinone which may be utilized in the compositions of the instant invention comprises a hydroquinone having the general formula:

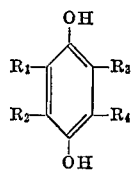

where $R_1$, $R_2$, $R_3$, and $R_4$ are selected from the group consisting of hydrogen, lower alkyl (for example, methyl, ethyl, butyl and hexyl), or chlorine and bromine. Examples of such compounds include hydroquinone, methylhydroquinone, dimethylhydroquinone, tetramethylhydroquinone, ethylhydroquinone, tetrachlorohydroquinone, tetrabromohydroquinone, chlorohydroquinone and bromohydroquinone.

The quinone utilized in the inhibitor system of this invention may be a quinone of the general formula:

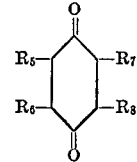

where $R_5$, $R_6$, $R_7$, and $R_8$ are selected from the group consisting of hydrogen, lower alkyl (for example, methyl, ethyl, butyl and hexyl), or chlorine and bromine. Examples of such compounds include quinone, methyl quinone, ethylquinone, butylquinone, dimethylquinone, tetramethylquinone, tetrachloroquinone, tetrabromoquinone, chloroquinone, bromoquinone. The presently preferred quinone is methylquinone.

The amount of inhibitor employed is usually small in relation to the weight of polymerizable mixture, thus the 2,4-dinitrophenol is generally employed in the range of from about 0.001 to about 0.2 or 0.3 weight percent of the polymerizable mixture and preferably from about 0.005 to about 0.02 weight percent of the polymerizable mixture. The quinone or hydroquinone, when present, is employed in a range of from about 0.0005 to about 0.05 or even 0.1, but preferably from about 0.002 to about 0.01. The stabilizers of the instant invention are equally effective in the presence of other known stabilizers which may be present to achieve general or specialized stability.

It will be appreciated that many of the polymerizable monomers, such as alpha-methyl styrene or styrene and the like, which may be employed in the copolymerizable mixtures in accordance with the provisions of the present invention as sold commercially contains small amounts of inhibitors of gelation in order to permit their storage and shipment without premature gelation or polymerization. Commonly, t-butyl catechol, quinone and hydroquinone or substituted derivatives thereof are employed for such a purpose, but others may be included. Such commercial monomers containing a small amount of stabilizers of the conventional type may be employed in the preparation of the mixtures herein described. Usually the amount of inhibitor introduced into the mixture is relatively small since the monomer is only a part of the mixture. Also, the amount of inhibitor still present in the monomer may be substantially depleted during storage before it is admixed with the polyester. Accordingly, the stabilizer introduced through the monomer is not objectionable and the inhibitor system of the present invention will operate in the presence of these inhibitors; however, if desired, it may be removed from commercial monomers by distillation or other appropriate techniques known to those in the art.

The mixtures of polyesters, monomers and inhibitors can be stored for long periods of time without substantial tendency to gel. When it is desired to employ the mixtures in a curing process, there is normally added a sufficient amount of an appropriate free-radical initiating catalyst, such as an organic peroxide. For room temperature cure, a preferred catalyst is methyl ethyl ketone peroxide; others include hydrogen peroxide cumene hydroperoxide-vanadium accelerator systems and benzoyl peroxide-amine accelerator systems. In the typical molding operation, the mixture is heated to the molding temperature for a time sufficient to effect a cure. Here benzoyl peroxide is a preferred catalyst; others include cyclohexanone peroxide, tertiary butyl perbenzoate, lauryl peroxide, dicumyl peroxide and ditertiary butyl peroxide. These catalysts may be added in amounts, usually of about 0.01 percent or higher, up to about 5 percent by weight of the resin. Approximately about 0.5 to about 1 percent by weight is usually satisfactory. The peroxide catalyst may be stirred into the polymerizable mixture in a conventional manner. If desired, the catalyst may be diluted with the alpha-methyl styrene or one of the additional monomers. The catalyst will usually be added at as short a period as practicable before it is desired to effect a cure of the copolymerizable mixture.

It is understood that in normal casting, molding or forming operations the copolymerizable mixture is introduced into a mold along with glass fibers or glass mat and/or other inert fillers, if desired. The techniques of formulating such final compositions and the use of glass or other suitable reinforcement materials is well-known to those skilled in the art and needs little discussion.

The following examples set forth a specific embodiment of the instant invention; however, the invention is not to be construed as being limited to this embodiment, for there are, of course, numerous possible variations and modifications.

All parts and percentages in the examples, as well as throughout the specification, are by weight unless otherwise specified. The percentage of methyl ethyl ketone peroxide was by volume.

EXAMPLE I

An unsaturated polyester resin was prepared from 3 mols of maleic anhydride, 7 mols of phthalic anhydride and 10.6 mols of propylene glycol. The resin had a Gardner-Holdt alkyd viscosity of I at 60 percent solids in ethyl Cellosolve.

Resin A

A polyester-monomer mixture was then formulated as follows:

| | Parts by weight |
|---|---|
| Unsaturated polyester mixture (as above) | 58.7 |
| Alpha-methyl styrene | 8.5 |
| Styrene | 32.8 |
| Hydrocarbon wax | 0.048 |
| Cobalt octoate (12% cobalt metal) | 0.2 |
| 2,4-dinitrophenol | 0.015 |

The resin mixture was placed in a bottle and put in an oven at 150° F. This resin mixture had a stability of 7–10 days. It was noted that while the mixture had good stability, that a "skin" formed at the top of the bottle, probably due to contact with air. The inclusion of a quinone or hydroquinone eliminated this problem.

The following polyester-monomer mixture was formulated:

Resin B

| | Parts by weight |
|---|---|
| Unsaturated polyester mixture (as above) | 61 |
| Alpha-methyl styrene | 8 |
| Styrene | 31 |
| Methyl hydroquinone | 0.005 |
| 2,4-dinitrophenol | 0.012 |
| 12% cobalt octoate | 0.2 |
| Hydrocarbon wax | 0.048 |

This resin was placed in a bottle and put in an oven at 150° F. The mixture had an oven stability of 7–8 days.

In addition to the increased storage stability, the above resin when catalyzed with 0.5 percent methyl ethyl ketone peroxide was more stable to gel time drift at 77° F. than material containing inhibitors other than 2,4-dinitrophenol.

The above resin, inhibited with 0.011 percent hydroquinone or methyl hydroquinone as the only inhibitor would have an oven stability of only around one to two days at 150° F., although the gel time with 0.5 percent methyl ethyl ketone peroxide would be about the same.

Resins A and B may be catalyzed with methyl ethyl ketone peroxide to obtain a cure at room temperature. When 1000 grams of the resin in a quart can is cooled to 73° F., catalyzed with 0.5 percent methyl ethyl ketone peroxide, and allowed to gel at a room temperature of about 77° F., a gel time of about 80 to 110 minutes will be obtained. The hardness of the cured product will be about 85 to 95 Shore D. Large, useful castings, with or without fillers, can easily be made by those skilled in the art.

EXAMPLE II

An unsaturated polyester resin was prepared from 3 mols of maleic anhydride, 7 mols of phthalic anhydride, 10.7 mols of propylene glycol. The resin had an acid number of 43.2 and an alkyd viscosity of H.

The following mixtures were formulated:

| | Parts by weight | |
|---|---|---|
| | Resin C | Resin D |
| Unsaturated polyester (as above) | 61 | 61 |
| Styrene | 39 | |
| Alpha-methyl styrene | | 39 |
| Methyl hydroquinone | 0.005 | 0.005 |
| Hydrocarbon wax | 0.048 | 0.048 |

The following 250° F. oven stability tests were run:

| | Hours | |
|---|---|---|
| | Resin C | Resin D |
| Control (as above) | 1–2 | 9–11½ |
| Plus 0.01%: | | |
| Tertiary butyl catechol | 1–2 | 9–11½ |
| Methyl quinone | 3 | 9–11½ |
| Methyl hydroquinone | 3 | 10½–11½ |
| 2,4-dinitrophenol | 7 | 17–½ |

EXAMPLE III

The following comparisons were made. Resin C (Example II, above) was the base material:

(1) 150° F. OVEN STABILITY

| | Days |
|---|---|
| Control | 5 |
| +0.05% tertiary butyl catechol | 12 |
| +0.05% 2,4-dinitrophenol | >31 |

(2) TANK LIFE—77° F.

Resin C:

| | Days |
|---|---|
| +2% benzoyl peroxide | 6 |
| +0.05% tertiary butyl catechol, 2% benzoyl peroxide | 19 |
| +0.05% 2,4-dinitrophenol, 2% benzoyl peroxide | >31 |

(3) TANK LIFE—110° F.

Resin C:

| | Hours |
|---|---|
| +2% benzoyl peroxide | 32–48 |
| +0.05% methyl quinone, 2% benzoyl peroxide | 45–47 |
| +0.05% methyl hydroquinone, 2% benzoyl peroxide | 50–64 |
| +0.05% tertiary butyl catechol, 2% benzoyl peroxide | 25–41 |
| +0.05% 2,4-dinitrophenol, 2% benzoyl peroxide | 67–91 |

(4) TANK LIFE

| | 77° F. | 110° F. |
|---|---|---|
| Resin C (Example II above), plus— | | |
| 3% DDM (60% methyl ethyl ketone peroxide in dimethyl phthalate) | 7–23 hours | <4 hours |
| 0.05% methyl quinone, 2% DDM | 52–66 hours | 4–20 hours |
| 0.05% methyl hydroquinone, 2% DDM | 26–42 hours | 2–18 hours |
| 0.05% tertiary butyl catechol, 2% DDM | 24–40 hours | 1–16 hours |
| 0.05% 2,4-dinitrophenol, 2% DDM | >31 days | 54–68 hours |

The inhibitors hereinabove discussed may be substituted for the inhibitors of the examples to provide beneficial results within the scope of the invention.

According to the provisions of the Patent Statutes, there are described above the invention and what is now

We claim:
1. A stabilized composition comprising:
   (A) 50 to 90 percent by weight of a polyester of an ethylenically unsaturated dicarboxylic acid and a polyhydric alcohol;
   (B) 10 to 50 percent by weight of a copolymerizable, ethylenically unsaturated monomer, at least one percent of which is α-methyl styrene; and
   (C) a stabilizing amount of 2,4-dinitrophenol.
2. A composition as in claim 1 wherein the monomer (B) is a mixture of styrene and alpha-methyl styrene.
3. A stabilized composition as in claim 1 comprising:
   (A) 50 to 90 percent by weight of an unsaturated polyester resin;
   (B) 10 to 50 percent by weight of a copolymerizable monomer at least one percent of which is α-methyl styrene:
   (C) A stabilizing amount of an inhibitor comprising:
      (I) 2,4-dinitrophenol, and
      (II) a member selected from the group consisting of:
         (1) a hydroquinone having the formula:

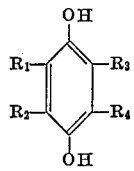

where $R_1$, $R_2$, $R_3$ and $R_4$ are selected from the group consisting of hydrogen, lower alkyl, chlorine and bromine; and
         (2) a quinone having the formula:

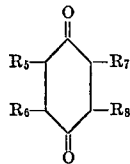

where $R_5$, $R_6$, $R_7$ and $R_8$ are selected from the group consisting of hydrogen, lower alkyl, chlorine and bromine.
4. A composition as in claim 3 wherein the monomer (B) comprises a mixture of styrene and alpha-methyl styrene.
5. A composition as in claim 3 wherein (II) comprises a member selected from the group consisting of methylquinone and methylhydroquinone.
6. A composition as in claim 1 comprising:
   (A) 50 to 90 percent by weight of a polyester of an ethylenically unsaturated dicarboxylic acid and a polyhydric alcohol;
   (B) 10 to 50 percent by weight of an α-methyl styrene;
   (C) a stabilizing amount of an inhibitor comprising:
      (I) 2,4-dinitrophenol; and
      (II) a member selected from the group consisting of:
         (1) a hydroquinone having the formula:

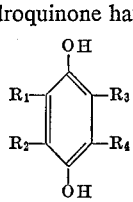

where $R_1$, $R_2$, $R_3$ and $R_4$ are selected from the group consisting of hydrogen, lower alkyl, chlorine and bromine; and
         (2) a quinone having the formula:

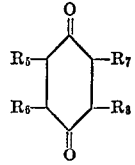

where $R_5$, $R_6$, $R_7$ and $R_8$ are selected from the group consisting of hydrogen, lower alkyl, chlorine and bromine.
7. A composition as in claim 6 wherein (II) comprises a member selected from the group consisting of methylquinone and methylhydroquinone.
8. A stabilized composition consisting essentially of:
   (A) 50 to 90 percent by weight of a polyester of an ethylenically unsaturated dicarboxylic acid and a polyhydric alcohol;
   (B) 10 to 50 percent by weight of a copolymerizable, ethylenically unsaturated monomer, at least one percent of which is α-methyl styrene; and
   (C) a stabilizing amount of 2,4-dinitrophenol.
9. A composition as in claim 8 wherein the monomer (B) is a mixture of styrene and alpha-methyl styrene.
10. A stabilized composition as in claim 8 consisting essentially of:
   (A) 50 to 90 percent by weight of an unsaturated polyester resin;
   (B) 10 to 50 percent by weight of a copolymerizable monomer at least one percent of which is α-methyl styrene;
   (C) a stabilizing amount of an inhibitor comprising:
      (I) 2,4-dinitrophenol, and
      (II) a member selected from the group consisting of:
         (1) a hydroquinone having the formula:

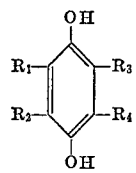

where $R_1$, $R_2$, $R_3$ and $R_4$ are selected from the group consisting of hydrogen, lower alkyl, chlorine and bromine; and
         (2) a quinone having the formula:

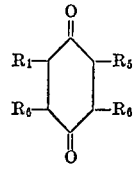

where $R_5$, $R_6$, $R_7$ and $R_8$ are selected from the group consisting of hydrogen, lower alkyl, chlorine and bromine.
11. A composition as in claim 10 wherein the monomer (B) comprises a mixture of styrene and alpha-methyl styrene.
12. A composition as in claim 10 wherein (II) comprises a member selected from the group consisting of methylquinone and methylhydroquinone.
13. A composition as in claim 8 consisting essentially of:
   (A) 50 to 90 percent by weight of a polyester of an ethylenically unsaturated dicarboxylic acid and a polyhydric alcohol;
   (B) 10 to 50 percent by weight of an α-methyl styrene;
   (C) a stabilizing amount of an inhibitor comprising:
      (I) 2,4-dinitrophenol; and (II) a member selected from the group consisting of:
(1) a hydroquinone having the formula:

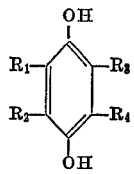

where $R_1$, $R_2$, $R_3$ and $R_4$ are selected from the group consisting of hydrogen, lower alkyl, chlorine, and bromine; and
(2) a quinone having the formula:

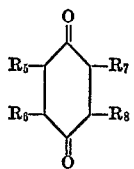

where $R_5$, $R_6$, $R_7$ and $R_8$ are selected from the group consisting of hydrogen, lower alkyl, chlorine and bromine.

14. A composition as in claim 13 wherein (II) comprises a member selected from the group consisting of methylquinone and methylhydroquinone.

References Cited

UNITED STATES PATENTS

| | | | |
|---|---|---|---|
| 2,593,787 | 4/1952 | Parker | 260—45.4 |
| 3,167,596 | 1/1965 | Joo | 260—666.5 |
| 3,247,162 | 4/1966 | Newland et al. | 260—45.9 |
| 3,092,609 | 6/1963 | Kostelitz et al. | 260—45.9 |
| 3,270,072 | 8/1966 | Pesacreta | 260—666.5 |
| 3,288,735 | 11/1966 | Watanabe et al. | 260—864 X |

OTHER REFERENCES

Mondvai Analogy, "Inhibition by Dinitrophenols," Magyar Kemiai Folyoirat, 73(8), August 1962, pp. 350–352.

Chemical Abstracts, vol. 34 (1940), p. 2235[8]; Foord, "Thermal Polymerization of Styrene and Its Inhibition."

Chemical Abstracts, vol. 54 (1960), p. 16909b, Lang, "Retardation of Polymerization in Substituted Styrene by Chelated Nitrophenols."

LESTER L. LEE, Primary Examiner

U.S. Cl. X.R.

260—459 R, 866

UNITED STATES PATENT OFFICE
CERTIFICATE OF CORRECTION

Patent No. 3,775,513           Dated November 27, 1973

Inventor(s) JOHN G. BAKER AND OLIVER M. YERTY

It is certified that error appears in the above-identified patent and that said Letters Patent are hereby corrected as shown below:

In Claim 10, section (2) thereof (Column 8, line 55), the formula should read as follows:

-- 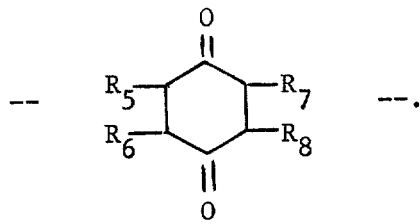 --.

Signed and sealed this 23rd day of April 1974.

(SEAL)
Attest:

EDWARD M.FLETCHER,JR.
Attesting Officer

C. MARSHALL DANN
Commissioner of Patents